(12) United States Patent
Samso Besora et al.

(10) Patent No.: US 10,125,761 B2
(45) Date of Patent: Nov. 13, 2018

(54) SYSTEM FOR SUPPLYING A PRESSURIZED LIQUID, METHOD FOR SUPPLYING A PRESSURIZED LIQUID USING SAID SYSTEM, AND MACHINE FOR PREPARING BEVERAGES THAT INCLUDES SAID SYSTEM

(71) Applicant: MINIMMA ESPRESSO, S. L., Manresa (Barcelona) (ES)

(72) Inventors: Xavier Samso Besora, Barcelona (ES); Angel Marquez Zamora, Barcelona (ES)

(73) Assignee: MINIMMA ESPRESSO, S.L., Barcelona (ES)

( * ) Notice: Subject to any disclaimer, the term of this patent is extended or adjusted under 35 U.S.C. 154(b) by 683 days.

(21) Appl. No.: 14/375,990

(22) PCT Filed: Feb. 4, 2013

(86) PCT No.: PCT/ES2013/070059
§ 371 (c)(1),
(2) Date: Jul. 31, 2014

(87) PCT Pub. No.: WO2013/113972
PCT Pub. Date: Aug. 8, 2013

(65) Prior Publication Data
US 2014/0373726 A1 Dec. 25, 2014

(30) Foreign Application Priority Data
Feb. 3, 2012 (EP) .................... 12382041

(51) Int. Cl.
*F04B 49/00* (2006.01)
*F04B 3/00* (2006.01)
(Continued)

(52) U.S. Cl.
CPC .............. *F04B 49/002* (2013.01); *A47J 31/36* (2013.01); *F04B 1/26* (2013.01); *F04B 3/003* (2013.01)

(58) Field of Classification Search
CPC . F04B 49/002; F04B 3/003; F04B 1/26; A47J 31/36
(Continued)

(56) References Cited

U.S. PATENT DOCUMENTS 3,269,298 A 8/1966 Grundmann et al.
5,865,096 A * 2/1999 Kawabata ........... A47J 31/3652
99/283

(Continued)

FOREIGN PATENT DOCUMENTS

GB 842006 7/1960
WO WO2007/042893 4/2007
(Continued)

OTHER PUBLICATIONS

PCT Search Report and Written Opinion for PCT/ES2013/070059, completed Apr. 16, 2013.

*Primary Examiner* — Ibrahime A Abraham
*Assistant Examiner* — Biniam Asmelash
(74) *Attorney, Agent, or Firm* — Barnes & Thornburg LLP (57) ABSTRACT

System for supplying a pressurized liquid for machines for preparing beverages comprising a first cylinder (2a) and plunger (2b) assembly (2), said plunger (2b) defining inside its cylinder (2a) a chamber (5) for housing said liquid, said plunger (2b) being able to accumulate, in an active position, potential energy from the compression force applied to a fluid, said potential energy being susceptible of being transmitted as a pressure to the liquid inside said chamber (5), and it is characterized in that it comprises a second cylinder (3a) and plunger (3b) assembly (3), said second plunger (3b) defining inside its cylinder (3a) a chamber (4) for housing said fluid, said first (2) and second (3) assemblies of plunger (2b, 3b) and cylinder (2a, 3a) being associated so that the plunger (2b) of the first assembly (2) is susceptible of
(Continued)

accumulating, in its active position, potential energy from the compression force applied to the fluid housed inside the second assembly (3). Method for supplying pressurized liquid comprising the following steps: a) moving by continuous or discrete steps the plunger (2b) of said first assembly (2) to an active position in which said plunger (2b) accumulates potential energy from the compression force applied to the fluid housed inside the chamber (4) of the second assembly (3), b) charging liquid from a tank (14) in the chamber of the cylinder (2a) of said first assembly (2), said charging being done preferably during step a), when the plunger (2b) of the first assembly (2) is moved, the inline valve (15a) of the liquid distribution duct (11) remaining closed during said charge, and c) driving the push-button (16) associated with the liquid distribution duct (11) for opening the inline valve (15a) of said duct (11) and permitting the exit of pressurized liquid.

18 Claims, 5 Drawing Sheets (51) Int. Cl.
*A47J 31/36* (2006.01)
*F04B 1/26* (2006.01)

(58) Field of Classification Search
USPC .............................. 99/295, 302 R, 302 P, 300
See application file for complete search history.

(56) References Cited

U.S. PATENT DOCUMENTS

| | | | |
|---|---|---|---|
| 5,911,810 A * | 6/1999 | Kawabata | A47J 31/3652 99/289 P |
| 2007/0221056 A1* | 9/2007 | Kutella | F04B 3/003 92/61 |
| 2007/0227363 A1* | 10/2007 | Verna | A47J 31/38 99/279 |
| 2008/0286120 A1* | 11/2008 | Noord | F04B 9/1053 417/53 |
| 2012/0017767 A1* | 1/2012 | Samso Besora | A47J 31/38 99/302 R |

FOREIGN PATENT DOCUMENTS

| | | | |
|---|---|---|---|
| WO | WO2010/092542 | 8/2010 | |
| WO | WO2010/113116 | 10/2010 | |
| WO | WO 2010113116 A1 * | 10/2010 | ............. A47J 31/38 |

\* cited by examiner

SYSTEM FOR SUPPLYING A PRESSURIZED LIQUID, METHOD FOR SUPPLYING A PRESSURIZED LIQUID USING SAID SYSTEM, AND MACHINE FOR PREPARING BEVERAGES THAT INCLUDES SAID SYSTEM

CROSS-REFERENCE TO RELATED APPLICATIONS

This application is a national stage entry under 35 USC § 371(b) of PCT International Application No. PCT/ES2013/070059, filed Feb. 4, 2013, and claims the benefit of European Patent Application No. 12382041.7, filed on Feb. 3, 2012, both of which are expressly incorporated by reference herein.

The present invention refers to a system for supplying a pressurized liquid for machines for preparing beverages, and to a method for supplying the liquid that is used by said system.

The disclosed system is particularly suitable to be incorporated in machines for preparing "espresso" coffee, but it can be also applied to other machines for preparing beverages, or to machines for dosing liquid products in the food or pharmaceutical field.

BACKGROUND OF THE INVENTION

Machines for preparing beverages have been developed, such as e.g. machines for preparing coffee, presenting the particularity that the liquid pressure to obtain the coffee is provided by systems alternative to the electric pressure pump, to obtain autonomous machines, in which the coffee can be distributed avoiding said pump and the maintenance and low power efficiency problems involved with its use.

The international patent application WO2010/113116 discloses a machine for preparing coffee of said kind, in which the system for supplying pressurized liquid comprises a first cylinder and plunger assembly provided with a chamber for housing water, the plunger of said chamber being able to accumulate, in an active position, potential energy from the compression force applied to a fluid provided in the chamber that houses the rod of said plunger. In said patent application, the potential energy accumulated by the plunger can be transmitted as pressure to the water inside said chamber, when it contacts said plunger, in its active position, with the water inside said chamber.

The system for supplying pressurized liquid disclosed in said patent has the advantage that it is an efficient system that permits to carry out a stable liquid distribution at a constant high pressure of 5-10 bars (pressure needed for the "espresso" coffee), optimising the electric consumption and the manufacturing and maintenance costs of the prior art machines for preparing beverages.

However, the pressurized system of said patent has some drawbacks. For example, pressure losses of the fluid chamber have been detected, and also possible contamination problems of the fluid inside the chamber that houses the liquid to be pressurized supplied.

To solve these problems, the enhancements have been focused on the sealing of the cylinder and plunger assembly that houses the fluid and the liquid. However, it has been observed that this enhancement makes the cost the manufacturing and the maintenance of the machines of the system more expensive and complicated.

DESCRIPTION OF THE INVENTION

The object of the present invention is to solve said drawbacks, developing a system and a method for supplying pressurized liquid that solves said problems.

According to this object, according to a first aspect, the present invention provides a system for supplying pressurized liquid for machines for preparing beverages, such as e.g. a machine for preparing coffee, comprising a first cylinder and plunger assembly, said plunger defining inside the cylinder a chamber for housing said liquid, said plunger being able to accumulate, in an active position, potential energy from the compression force applied to a fluid, said potential energy being susceptible of being transmitted as a pressure to the liquid of said chamber, when it contacts said plunger, in said active position, with the liquid of said chamber, and it is characterised in that it comprises a second cylinder and plunger assembly, said second plunger defining inside its cylinder a chamber to house said fluid, said first and second plunger and cylinder assemblies being associated so that the plunger of the first assembly is susceptible of accumulating in its active position potential energy from the compression force applied to the fluid housed inside the inner chamber of the second cylinder and plunger assembly.

In the system of the present invention, the plunger that transmits pressure to the liquid accumulates potential energy from the compression force applied to a fluid that is placed inside the chamber of a second plunger and cylinder assembly.

Thanks to this feature, the pressure losses of the fluid are nearly non-existent. Furthermore, said second plunger and cylinder assembly can be configured from a compact fluid-dynamic assembly of commercial kind, e.g. a nitrogen pneumatic piston that can be engaged easily, even detachably, with the plunger of the first assembly that contacts the liquid.

On the other hand, as the fluid is housed inside the chamber of the second cylinder and plunger assembly, the probability of fluid contamination inside the chamber that houses the liquid disappears.

Another advantage of the system is that it can be adapted easily to different pressure requirements of the machines for preparing beverages, because it is just necessary to change the fluid charge of the second cylinder and plunger assembly to obtain a higher or lower pressure in the plunger that contacts the liquid.

Preferably, the compression force is applied to a gaseous fluid, such as e.g. air or nitrogen, housed inside the chamber of the second cylinder and plunger assembly.

According to a preferred embodiment, the cylinder of said second assembly is coaxially placed inside the cylinder of said first assembly, the plunger of said first assembly being susceptible of retracting inside its cylinder to move the cylinder of said second assembly when the plunger of said second assembly remains fixed to compress the fluid inside the chamber.

This embodiment has the advantage that permits to obtain a suitable and constant pressure with a substantially little fluid volume, because the fluid is housed inside a chamber placed inside the cylinder that contains the liquid.

Thanks to this feature, a system that solves the prior art problems regarding the pressure losses and fluid contamination is obtained, and furthermore, it has a very reduced size, so that it is suitable to be applied to machines for preparing beverages, such as e.g. portable, domestic or professional machines of "espresso" coffee.

Preferably, the plunger rod of said second assembly is coaxially placed inside the plunger rod of said first assembly, the rod of said first assembly being susceptible of being moved on the rod of the second assembly to retract the plunger of the first assembly.

Advantageously, said first cylinder and plunger assembly includes a skirt-like housing piece that surrounds the cylinder of the second assembly, and detachable joining means of said housing piece to the plunger rod of said first assembly.

This configuration permits to substitute or replace easily the second cylinder and plunger assembly to carry out, e.g. maintenance operations.

According to a first alternative, the diameter of the plunger of the first assembly is from 15 and 50 mm, the diameter of the plunger of the second assembly being substantially the same or lower than said diameter of the plunger of the first assembly.

It has been observed that this diameter range is suitable to prepare, e.g. "espresso" coffees from 25 and 35 ml with a pressure from 7 to 9 bars.

According to a second alternative, the plunger diameter of said first assembly is higher than 50 mm and the same or lower than 150 mm, the plunger diameter of the second assembly being substantially the same or lower than said plunger diameter of the first assembly.

It has been observed that the system can be sized with this range to prepare coffees, e.g. from 50 to 90 ml at a pressure that is the same or lower than 5 bars.

Preferably, the base wall of the cylinder of the first assembly comprises a hole provided with a duct for distributing the pressurized liquid, said duct including an inline valve for regulating the liquid outlet.

This inline valve can be of a kind that remains closed by the pressure by the liquid inside the cylinder chamber of the first assembly, and it is opened by a push-button to permit the controlled exit of the pressurized liquid.

Again preferably, the length of said duct for distributing pressurized liquid is lower than 20 mm.

The system of the present invention has the advantage, with respect to other prior art systems, that the duct for distributing pressurized liquid can be a duct with a very reduced length, that reduces substantially the problems derived from the calcification present in the prior art systems. This affects very positively to the maintenance costs.

According to one embodiment, the base wall of the cylinder of the first assembly comprises a hole provided with a duct for the suction of liquid from a storage tank, said duct including a valve to prevent the return of liquid once suctioned.

This embodiment has the advantage that permits to charge liquid by suction when the plunger of the first assembly is retracted inside its cylinder to reach its active position. Furthermore, this embodiment has also the advantage that the duct that supplies the water can be of a diameter higher that those of the prior art ones (from 4-8 mm, instead of 2-3 mm) and it can have a shorter path, which permits to prevent calcification problems.

Again advantageously, said tank is a tank for storing liquid at an atmospheric pressure advantageously including means for heating the liquid by, e.g. resistors, or induction, radiation means, etc.

Therefore, the electric consumption is optimised because it is not necessary to use pressure groups for the input of liquid, and the charge can be carried out by the suction by liquid depression when the inline valve of the liquid distribution duct remains closed. Furthermore, the water of said tank can be heated with no pressurized boiler, which makes easier the use of non-metallic ducts that contribute to prevent the calcification problems and reduce the electric consumption of the prior art alternatives.

Advantageously, said duct for distributing pressurized liquid is joined to said liquid suction duct from the storage tank, the liquid distribution and suction being done through just one hole provided on the base wall of said cylinder, said hole including an inline valve for regulating the flow of both ducts.

Therefore, the construction of the system is simplified and the problems of air entrance inside the liquid chamber are minimized.

Preferably, the body of said inline valve includes a first discharge length that is associated with a push-button, and a second discharge length that is associated with said storage tank, said first length regulating the liquid distribution flow and said second length the liquid suction flow.

Again preferably, the base wall of the cylinder of the first assembly comprises a lever that is associated with the liquid suction duct of said tank, said lever being susceptible to be driven by the plunger of said first assembly when said plunger contacts the lever at the cylinder base, the driving of the lever making possible the aperture of the inline valve of the liquid suction duct of the tank to bleed air from inside the cylinder chamber.

The lever of the cylinder base associated with the inline valve of the liquid suction duct configures an air drain device that presents the advantage that it is incorporated inside the pressurized chamber and it permits to bleed the air automatically from said chamber.

According to a second aspect, the present invention provides a method for supplying pressurized liquid by the claimed system comprising the steps of:

a) moving by continuous or discrete steps the plunger of said first cylinder and plunger assembly to an active position in which said plunger accumulates potential energy from the compression force applied to the fluid housed inside the chamber of the second cylinder and plunger assembly;

b) charging liquid from a tank through a hole of the base wall of the cylinder of the first cylinder and plunger assembly, said charging being done preferably during step a), when the plunger of the first assembly is moved, the inline valve of the liquid distribution duct remaining closed during said charge;

c) driving the push-button associated with the liquid distribution duct to open the inline valve of said duct and to permit the exit of pressurized liquid through said duct, the plunger of said first assembly recovering its rest position inside the chamber when the pressurized liquid is supplied.

In the process of the present invention, the movement of the plunger permits, on one hand the liquid charge and, on the other hand, the storage of pressurized liquid when said plunger contacts the stored liquid, the inline valve being kept closed.

Advantageously, the liquid charging in step b) is done by a duct that communicates the hole of the base wall of the cylinder of the first assembly with a tank for storing liquid at an atmospheric pressure, said charging being done by suction by liquid depression through said duct when the inline valve of the liquid distribution duct is kept closed.

Therefore, the liquid charging can be done autonomously with no need of pressurized groups and with no need of power sources external to the machine.

The system and the method for supplying pressurized liquid of the present invention permits to distribute steadily liquid at a constant pressure at a pressure higher than 6 bars. It is a simple system that can be manually driven and that reduces the number of components of the current systems, it saves energy and reduces the maintenance costs, as it reduces substantially the calcification problems of the current systems.

According to a third aspect, the present invention provides a machine for preparing beverages, such as e.g. a machine for preparing normal or "espresso" coffee, including the claimed system for supplying pressurized liquid.

BRIEF DESCRIPTION OF THE DRAWINGS

For a better understanding of what has been disclosed, some drawings are attached in which, diagrammatically and only as a non-limitative example, a practical embodiment is shown.

In said drawings.

DESCRIPTION OF A PREFERRED EMBODIMENT

Hereinafter a preferred embodiment of the system of the present invention is disclosed, that is applied to a machine 1 for preparing "espresso" coffee.

Figure 2:
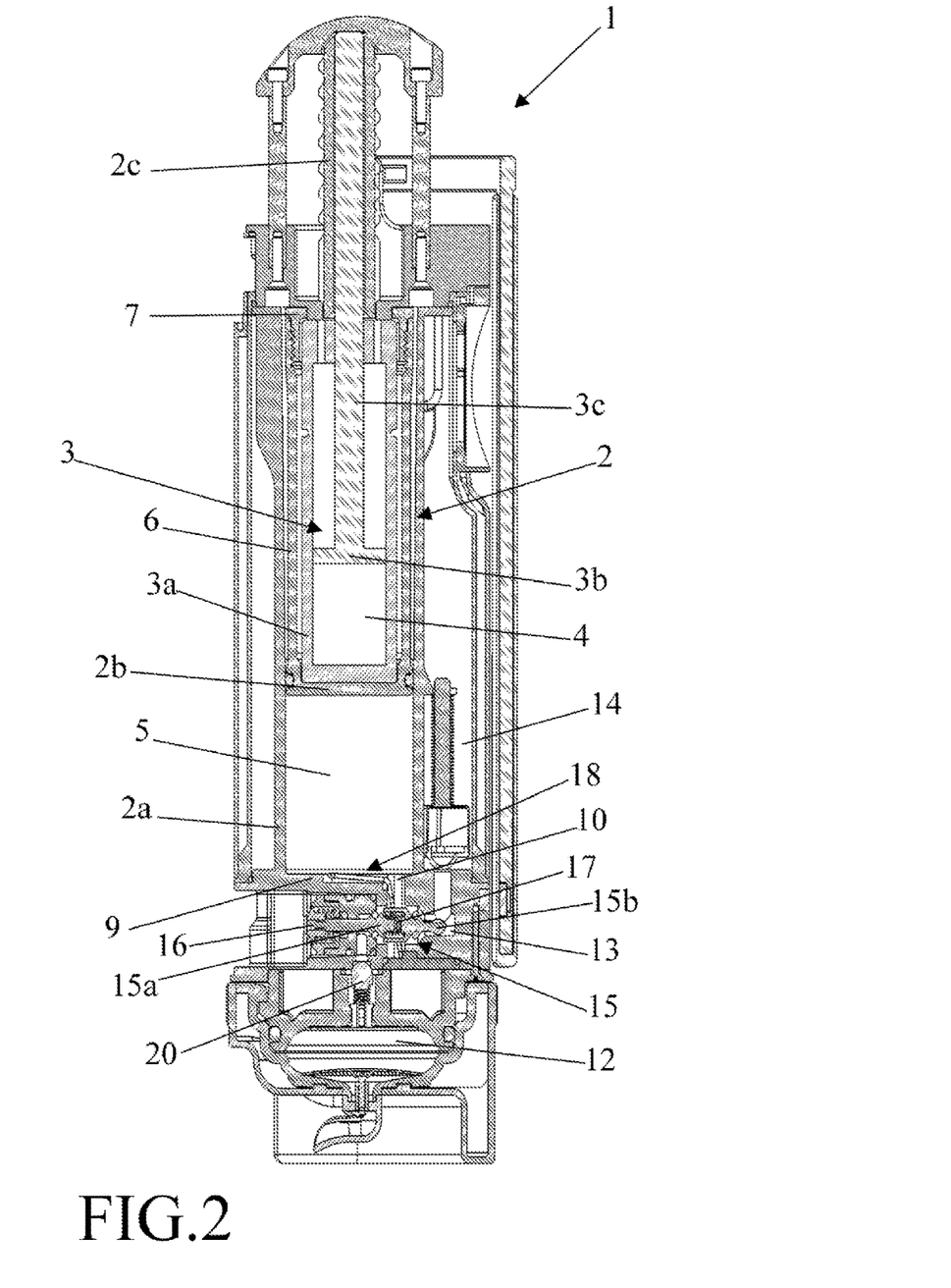
Figure 3:
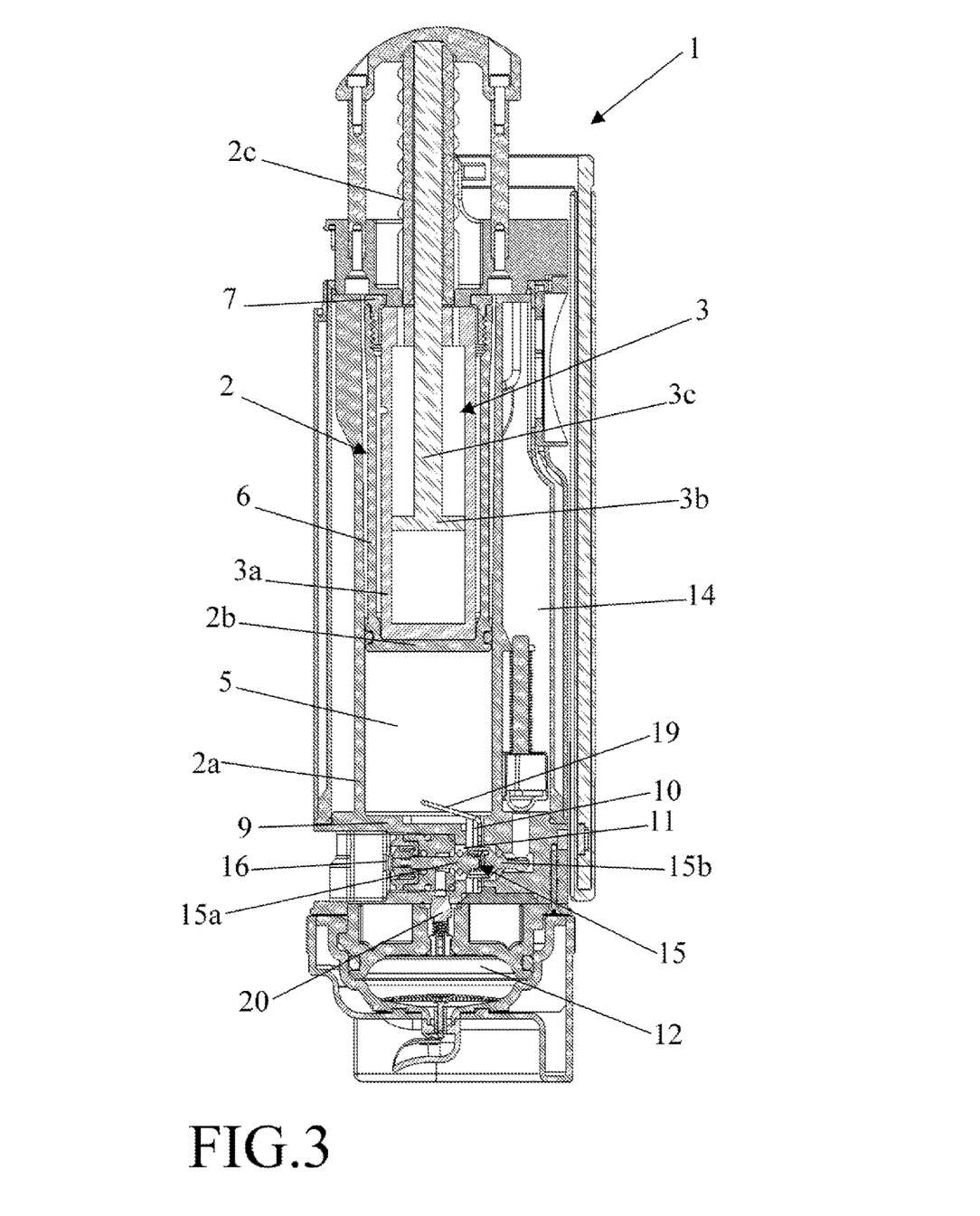

The system comprises a first cylinder 2a and plunger 2b assembly 2 and a second cylinder 3a and plunger 3b assembly 3 that are associated so that the plunger 2b of the first assembly 2 is susceptible of accumulating in an active position potential energy from the compression force applied to a fluid housed inside the chamber 4 of the second cylinder 3a and plunger 3b assembly 3 (see the active position of the plunger 2b in FIGS. 2 and 3).

In the described embodiment, to reduce the size of the system, the cylinder 3a of the second assembly 3 has been placed coaxially inside the cylinder 2a of the first assembly 2, the plunger 2b of the first assembly 2 being susceptible of being retracted inside its cylinder 2a to move the cylinder 3b of the second assembly 3 when the plunger 3b of said second assembly 3 remains fixed to compress the fluid inside the chamber 4.

In the position shown in FIGS. 2 and 3, the plunger 2b of the first assembly defines inside its cylinder 2a a pressurized chamber 5 to house a preset quantity of water for preparing coffee. This plunger 2b is susceptible of accumulating potential energy from the compression force applied to the fluid inside the chamber 4 of the cylinder 3a, and the potential energy can be transmitted as a pressure to the liquid or water stored inside the pressurized chamber 5.

Figure 5:
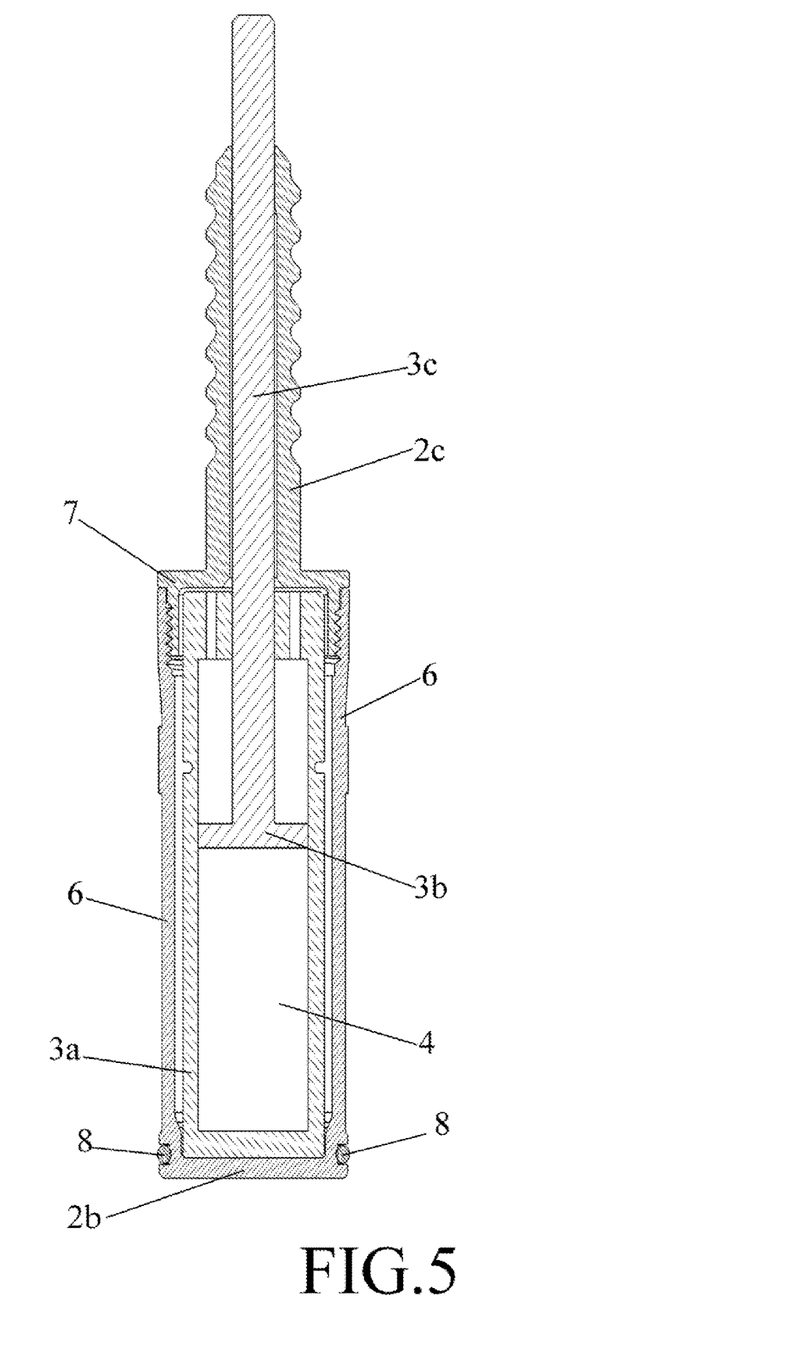
FIG. 5 shows a longitudinal section of the second cylinder and plunger assembly and of the piece that houses the cylinder of said second assembly.

FIG. 5 shows a detail of the longitudinal section of the second cylinder 3a and plunger 3b assembly 3, and a housing piece 6 for surrounding as a skirt said cylinder 3a. This housing piece 6 is associated with the plunger 2b of the first assembly 2, and also with a piece 7 that detachably joins said housing piece 6 to the rod 2c of the plunger 2b of the first assembly 2. In the same FIG. 5, it can be seen in detail the coaxial arrangement of said rod 2c and the rod 3c of the second assembly 3.

The configuration shown in FIG. 5 has the advantage that permits to substitute or replace easily the second cylinder 3a and plunger 3b assembly 3 to carry out e.g. maintenance operations, or for adapting the system to the pressure requirements of the machine for preparing coffee (different fluid charges of the second assembly to provide more or less pressure).

As stated previously in the description of the invention, the claimed system has the advantage that the compression force is applied to a fluid that is placed inside a chamber 4 of a second plunger 3a and cylinder 3b assembly 3. Thanks to this feature, the pressure losses of fluid through the ring seals 8 of the plunger 2b of the first assembly 2 are substantially non-existent. Furthermore, said second cylinder 3a and plunger 3b assembly 3 can be configured by a compact fluid-dynamic assembly of commercial kind, such as e.g. an air or nitrogen pneumatic piston, that can be substituted, according to the pressure requirements of the machine 1, just unthreading the housing piece 6.

In the embodiment shown in FIGS. 1-4, the first cylinder 2a and plunger 2b assembly 2 has been chosen with a diameter of 38 mm to provide about 35 ml of water at a pressure of 7.4 bars. However, as stated previously, the same assembly 2 can be chosen, e.g. with a diameter of 60 mm to provide about 90 ml of water at a pressure of 2 bars.

Returning back to FIGS. 1-4, it will be observed that the base wall 9 of the cylinder 2a of the first cylinder and plunger 2b assembly 2 comprises a hole 10 provided with a duct 11 for distributing the pressurized water to an infusion chamber 12 of the coffee machine.

In the disclosed embodiment, the water distribution duct 11 is joined to a water suction duct 13 from a tank 14 for storing water at atmospheric pressure, the suction and distribution of the water being done through said single hole 10 of the base wall 9 of the cylinder 2a. Even it is not shown, the tank 14 can include means for heating the water at atmosphere pressure.

As shown in the drawings, the hole 10 includes an inline valve 15 for regulating the flow of both ducts 11, 13. This valve 15 comprises a first discharge length 15a that is associated with a push-button 16, and a second charge length 15b that is associated with the tank 14.

In the described embodiment, the inline valve 15 includes a central spring 17 associated with both lengths 15a, 15b on which the water pressure of the chamber 5 acts to close the flow of both ducts 11, 13. The water discharge through the duct 11 is carried out when the discharge length 15a of the valve 15 is moved with the push-button 16. The water charge through the duct 13 is carried out when the charge length 15b of the valve 15 is moved by the depression generated by the water suction of the water tank 14 at atmospheric pressure.

As stated previously in the description of the invention, the unification of the distribution 11 and water suction 14 ducts, and the inline valve 15, provides the advantage that simplifies the construction of the system and minimizes the problems related with the entrance of air to the chamber 5 that houses the water.

Even though the precautions taken to minimize the air entrance to the pressurized chamber 5 that houses the water, it has been observed that it can be necessary to guarantee the air bleeding of said pressurized chamber 5 during the suction by an automatic drainage device 18 that is incorporated inside the same pressurized chamber 5.

Said device 18 includes a lever 19 that is associated with the length 15b of the inline valve 15 of the water suction duct 13 of the tank 14, said lever 19 being susceptible of being driven by the plunger 2b of said first cylinder 2a and plunger 2b assembly when said plunger 2b contacts with the lever 19 at the base of the cylinder 2a.

As shown in the drawings, the lever 19 is configured and placed, with respect to the charging length 15b of the valve 15 so that its driving permits to open said charging length 15b to bleed air inside the pressurized chamber 5 through the suction duct 13 that communicates with the tank 14 at atmospheric pressure.

Hereinafter the method for supplying the pressurized liquid by the claimed system is described, making reference to the operating cycle shown in FIGS. 1-4.

Figure 1:
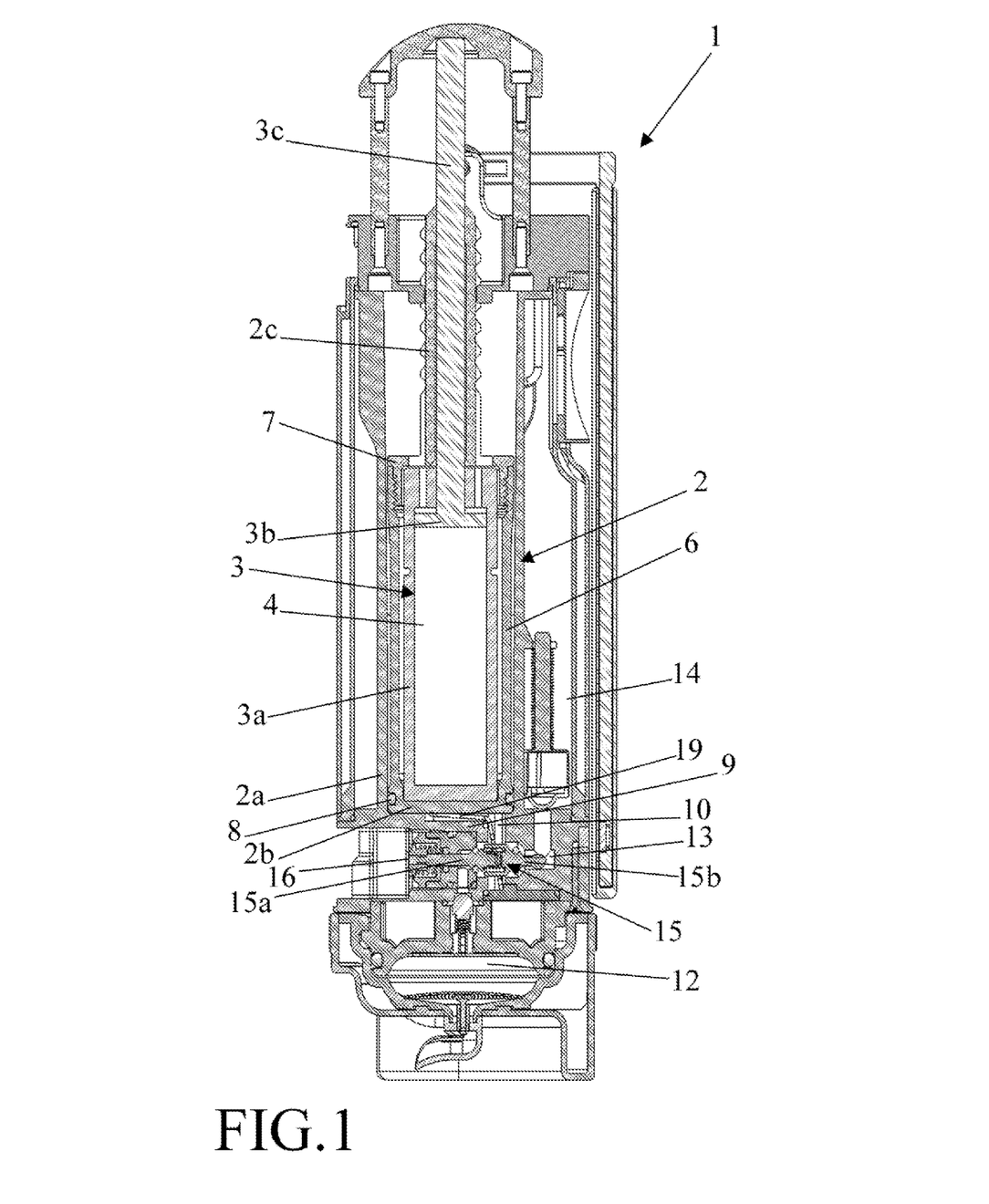
FIGS. 1-4 show an assembly of longitudinal sections of a machine for preparing coffee including one embodiment of the system for supplying liquid of the present invention. Each of the figures corresponds to a step of the operation cycle of the system.

In the first starting step of the method shown in FIG. 1, the plunger 2b of the first cylinder 2a and plunger 2b assembly 2 is placed in a rest position in which it contacts with the base wall 9 of the cylinder 2a. In this position, the plunger 2b drives the lever 19 of the air draining device 18, opening the length 15b of the valve 15 of the suction duct 13 that communicates with the tank 14 to permit the air exit while the discharging length 15a of the valve 15 is in a closed position.

In a second step of the method shown in FIG. 2, the plunger 2b of the first cylinder 2a and plunger 2b assembly has been moved by a driving mechanism that acts on the rod 2c of said plunger 2b. This driving mechanism can include a manual reduction device as a lever that moves the rod 2c by discrete or continuous steps or e.g. a driving mechanism that includes a motorized reduction device.

The retraction of the rod 2b moves the cylinder 3a of the second cylinder 3a and plunger 3b assembly upwardly, while the plunger 3b of said second assembly remains fixed to compress the fluid inside the chamber 4. The retraction is done until the active position shown in FIG. 3 is reached.

During the retraction, if necessary, the plunger 2a can contact in a pressurized way the water stored inside the pressurized chamber 5 with no risk of a distribution starting, because the discharging length 15a of the valve keeps closed the liquid exit through the distribution duct 11. This detail has the advantage that makes easier to apply a driving mechanism as a lever of discrete steps.

In the described embodiment, the water charge of the pressurized chamber 5 is done by suction by depression from the tank 14, and the plunger 2b is moved simultaneously inside the cylinder 2a of the first assembly 2, the inline valve 15 of the distribution or discharging duct 11 remaining closed.

FIG. 2 shows the charging length 15b of the valve 15 in an opened position when the water charge is carried out by the depression produced inside the cylinder 2a by the movement of said plunger 2b. Obviously, the discharging length 15b permits the entrance of water, but not its exit (anti-return function). As the water can be charged by suction by depression, the system does not need pressurized groups, which provides a great autonomy.

As stated in the description of the invention, as there is air inside the pressurized chamber 5 when the water suction is carried out, the system has an automatic device 18 for draining air consisting in a lever 19 associated with the charging length 15b of the valve. This lever 19 can be driven by the plunger 2b when said plunger 2b contacts with the lever 19 in the base of the cylinder 2b, in the case that e.g. said plunger 2b suddenly lowers when the traction mechanism is released, due to the presence of air inside the pressurized chamber 5.

In a third step of the method shown in FIG. 3, once the pressurized chamber 5 of the cylinder 2a is full of water, the push-button 16 associated with the water distribution duct 11 is pressed to open the discharging length 15a of the inline valve 15 and to permit the exit of pressurized liquid through the hole 10 and said duct 11.

Differently from the conventional systems for supplying pressurized water, the system of the present invention has a distribution duct 11 with a very reduced length (lower than 20 mm) that offers a great number of advantages (lower calcification problems, greater distribution control, etc.). As shown in detail in FIG. 3, said water distribution duct 11 has, besides the inline valve 15 of the hole 10, a second inline valve 20 for controlling the air entrance.

Figure 4:
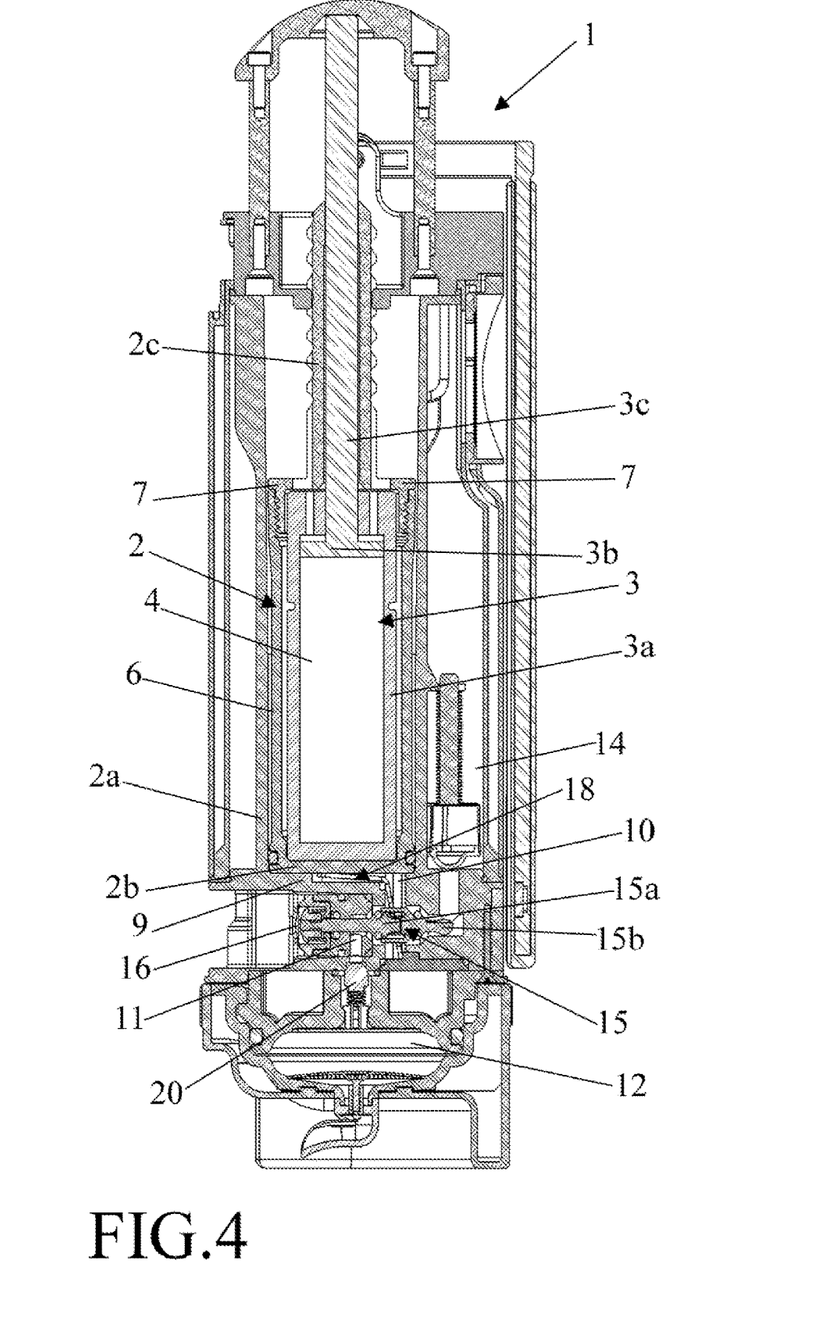

In the final fourth step of the method shown in FIG. 4, the plunger 2b of the first cylinder 2a and plunger 2b assembly 2 has recovered its starting resting position, and all the pressurized water has been supplied through the hole 10 and the duct 11 associated with said hole 10.

Differently from the prior art systems, the claimed system permits a water distribution with a constant pressure, resulting in a simple and autonomous system, that can be manually driven, that saves energy and that reduces the operation and maintenance costs of the machine on which it is applied.

Even though a specific embodiment of the present invention has been described and shown, it is apparent that a person skilled in the art can introduce variations and modifications, or to substitute the details by other technically equivalent ones, without departing from the scope of protection defined by the attached claims.

For example, even though reference is made in the present specification to a system applied to a machine for preparing "espresso" coffees, the same system could be applied to supply pressurized water to a machine for preparing coffee different from "espresso", or for supplying other pressurized liquid to a machine for preparing beverages, or to a machine for dosing liquid products in the food or pharmaceutical field. Similarly, even though the drawings refer to a system configured by just one pressurized unit (just one pair of cylinder and plunger assemblies 2, 3), the system itself could be configured for a plurality of pressurized units that could be installed e.g. in the same machine for preparing or dosing liquid products. On the other hand, even though reference is made to one embodiment in which the plunger 2b of the first assembly 2 moves the cylinder 3a of the second assembly 3 when the plunger 3b of the second assembly 3 remains fixed for compressing the fluid inside the chamber 4, similar results could be obtained with a system in which the plunger 2b of the first assembly 2 moves the plunger 3b of the second assembly when the cylinder 3a of the second assembly remains fixed to compress the fluid inside the chamber 4.

What is claimed is:

1. A system for supplying a liquid to a machine for preparing beverages, said system comprising;
 a first assembly comprising a first cylinder and a first plunger assembly having a first plunger, said first plunger disposed in the first cylinder and cooperating with the first cylinder to define a first chamber for housing said liquid, wherein the first assembly is configured to pressurize the liquid when the first plunger is in an active position,
 wherein said first plunger, when in the active position, accumulates potential energy from a compression force applied to a fluid, said potential energy is transmitted as a pressure to the liquid inside said first chamber when said first plunger contacts the liquid inside said first chamber, the system further comprising;
 a second assembly comprising a second cylinder and a second plunger assembly having a second plunger, said second plunger is disposed inside said second cylinder and cooperating with said second cylinder to define a second chamber for housing said fluid to be compressed, and said second plunger being arranged to act on the fluid inside the second chamber to compress the fluid, wherein said first assembly and said second assembly having are associated so that said first plunger accumulates potential energy from the compression force applied to the fluid in the second chamber when the first plunger is in the active position, and wherein the fluid in the second chamber is isolated from the liquid in the first chamber so that communication between the second chamber and the first chamber is blocked when the first plunger acts on the liquid, and wherein the second cylinder is coaxially placed inside the first cylinder.

2. The system according to claim 1, wherein the first plunger comprises a first rod and the second plunger comprises a second rod and the first plunger being susceptible of being retracted inside the first cylinder to move the second cylinder while the second plunger remains fixed to compress the fluid inside the second chamber.

3. The system according to claim 2, wherein the second rod is coaxially placed inside the first rod, the first rod being susceptible of being moved on the second rod to retract the first plunger.

4. The system according to claim 2, said first assembly comprising a skirt-like housing piece that surrounds the second cylinder, wherein a detachable joining means joins the housing piece to the first rod.

5. The system according to claim 1, wherein the diameter of the first plunger is between 15 mm and 50 mm, the diameter of the second plunger being substantially the same as or less than said diameter of the first plunger.

6. The system according to claim 1, wherein the diameter of the first plunger is greater than 50 mm and the same as or less than 150 mm, the diameter of the second plunger being substantially the same as or less than said diameter of the first plunger.

7. The system according to claim 1, wherein the first cylinder comprises a base wall comprising a hole provided with a duct for distributing the liquid, said duct including an inline valve for regulating the exit of the liquid.

8. The system according to claim 1, wherein the first cylinder comprises a base wall comprising a hole provided with a duct for suctioning the liquid from a storage tank of said liquid, said duct including a valve to prevent the return of the liquid, once suctioned.

9. The system according to claim 1, wherein the first cylinder comprises a base wall comprising a hole provided with a duct for suctioning the liquid from a storage tank of said liquid, said duct for distributing the liquid being joined to a duct for suctioning the liquid from a storage tank of said liquid, the distribution and the suction of liquid being done through said hole, said hole including an inline valve for regulating the flow of both ducts.

10. The system according to claim 9, wherein said inline valve includes a first discharging length that is associated with a push-button, and a second charging length that is associated with said storage tank, said first length regulating liquid distribution flow and said second length regulating liquid suction flow.

11. The system according to claim 9, wherein said liquid in said storage tank is at an atmospheric pressure and said storage tank includes a device, other than a pressurized boiler, for heating the liquid.

12. The system according to claim 11, wherein the base wall comprises a lever that is associated with the duct for suctioning, said lever being susceptible of being driven by the first plunger when said first plunger contacts the lever, the driving of said lever permitting an aperture of the inline valve for bleeding air from the chamber of the cylinder.

13. A machine for preparing beverages wherein said machine comprises at least one unit for supplying a pressurized liquid, said unit including a system for supplying a pressurized liquid, said system comprising;

a first assembly comprising a first cylinder and a first plunger, said first plunger located in said first cylinder and cooperating with the first cylinder to define a first chamber for housing said liquid, said first plunger being arranged to act on the liquid inside said first chamber to pressurize said liquid, wherein said first plunger is able to accumulate, in an active position, potential energy from a compression force applied to a fluid, said potential energy being transmitted as a pressure to the liquid inside said first chamber, when said first plunger contacts the liquid inside said first chamber; the system further comprising;

a second assembly comprising a second cylinder and a second plunger, said second plunger located in said second cylinder and cooperating with the second cylinder to define a second chamber for housing said fluid to be compressed, and said second plunger being arranged to act on the fluid inside the second chamber to compress it, wherein said first assembly and said second assembly are associated so that said first plunger accumulates, in its active position, potential energy from the compression force applied to the fluid housed inside said second chamber, and wherein the second cylinder is independent from the first cylinder and said second cylinder does not communicate with the first cylinder housing the first plunger and the fluid in the second chamber is isolated from the liquid in the first chamber so that communication between the second chamber and the first chamber is blocked when the first plunger acts on the liquid, and wherein the second cylinder is coaxially placed inside the first cylinder.

14. The machine according to claim 13, wherein the first plunger comprises a first rod and the second plunger comprises a second rod, the first plunger being susceptible of being retracted inside the first cylinder to move the second cylinder while the second plunger remains fixed to compress the fluid inside the second chamber.

15. The machine according to claim 14, wherein the second rod is coaxially placed inside the first rod, the first rod being susceptible of being moved on the second rod to retract the first plunger.

16. The machine according to claim 13, wherein the diameter of the first plunger is between 15 mm and 50 mm, the diameter of the second plunger being substantially the same as or less than said diameter of the first plunger.

17. The machine according to claim 13, wherein the diameter of the first plunger is greater than 50 mm and the same as or less than 150 mm, the diameter of the second plunger being substantially the same as or less than said diameter of the first plunger.

18. The machine according to claim 13, wherein the first cylinder comprises base wall comprising a hole provided with a duct for distributing the liquid, said duct including an inline valve for regulating the exit of the liquid.

* * * * *